United States Patent
Seki et al.

(10) Patent No.: US 10,919,450 B2
(45) Date of Patent: Feb. 16, 2021

(54) IMAGE DISPLAY DEVICE (71) Applicant: SUBARU CORPORATION, Tokyo (JP)

(72) Inventors: Junya Seki, Tokyo (JP); Eisuke Konishi, Tokyo (JP); Koichi Mizutani, Tokyo (JP); Masayuki Murakoshi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 31 days.

(21) Appl. No.: 15/949,906

(22) Filed: Apr. 10, 2018

(65) Prior Publication Data
US 2018/0304813 A1 Oct. 25, 2018

(30) Foreign Application Priority Data
Apr. 20, 2017 (JP) .............................. JP2017-083341

(51) Int. Cl.
*B60R 1/02* (2006.01)
*B60R 1/00* (2006.01)
(Continued)

(52) U.S. Cl.
CPC ................ *B60R 1/002* (2013.01); *B60R 1/00* (2013.01); *G06K 9/00805* (2013.01);
(Continued)

(58) Field of Classification Search
CPC ............... B60R 2300/802; B60R 11/04; B60R 2300/70; B60R 2300/607;
(Continued)

(56) References Cited

U.S. PATENT DOCUMENTS 6,593,960 B1 * 7/2003 Sugimoto ............... B60R 11/04
  348/142
7,605,856 B2 * 10/2009 Imoto .................... H04N 5/232
  348/335
(Continued)

FOREIGN PATENT DOCUMENTS

JP   H07-030149 U   6/1995
JP   H10-257482 A   9/1998
(Continued)

OTHER PUBLICATIONS

Japanese Notification of Reasons for Refusal issued in corresponding Japanese Patent Application No. 2017-083341, dated Mar. 26, 2019, with English Translation.

*Primary Examiner* — Daniel Chang
(74) *Attorney, Agent, or Firm* — McDermott Will & Emery LLP (57) ABSTRACT

An image display device includes an image capturing unit configured to capture an image of a rearview and a sideview from a host vehicle, and a display unit configured to display, as a display image, a captured image captured by the image capturing unit or a generated image generated based on the captured image. The display unit includes a first area for displaying the display image that includes an area to the rearview of the host vehicle and a second area, being arranged adjacent to the first area, for displaying the display image that includes an area to the sideview of the host vehicle, and the displayed image displayed in the second area is image-processed in such a manner that an aspect ratio changes with respect to an aspect ratio of the display image displayed in the first area.

7 Claims, 5 Drawing Sheets

US 10,919,450 B2
Page 2

(51) Int. Cl.
 *G06K 9/00* (2006.01)
 *H04N 7/18* (2006.01)

(52) U.S. Cl.
 CPC ............ *H04N 7/181* (2013.01); *H04N 7/183* (2013.01); *B60R 2300/105* (2013.01); *B60R 2300/202* (2013.01); *B60R 2300/303* (2013.01); *B60R 2300/306* (2013.01); *B60R 2300/60* (2013.01); *B60R 2300/605* (2013.01); *B60R 2300/802* (2013.01); *B60R 2300/8026* (2013.01); *B60R 2300/8046* (2013.01); *B60R 2300/8066* (2013.01); *B60R 2300/8093* (2013.01); *G06K 9/00597* (2013.01)

(58) Field of Classification Search
 CPC .... B60R 2300/8066; B60R 2001/1253; B60R 1/002; H04N 7/181; H04N 5/23238; G06T 19/006; G06T 7/20; G06K 9/00597
 USPC ............. 348/36, 39, 148, 149, 43, 135, 159; 701/36; 345/436; 382/103
 See application file for complete search history.

(56) References Cited

U.S. PATENT DOCUMENTS

| | | | | |
|---|---|---|---|---|
| 7,697,055 | B2* | 4/2010 | Imoto | H04N 7/183 348/335 |
| 9,308,863 | B2* | 4/2016 | Miyoshi | G06K 9/00805 |
| 9,511,711 | B2* | 12/2016 | Petrillo | B60Q 9/008 |
| 9,789,820 | B2* | 10/2017 | Yamamoto | G06K 9/4604 |
| 10,019,805 | B1* | 7/2018 | Robinson | G08G 1/04 |
| 10,336,255 | B2* | 7/2019 | Lynam | H04N 5/2254 |
| 2003/0095182 | A1* | 5/2003 | Imoto | H04N 7/183 348/148 |
| 2007/0165108 | A1* | 7/2007 | Yuasa | B60R 1/00 348/148 |
| 2009/0079553 | A1* | 3/2009 | Yanagi | B60R 1/00 340/435 |
| 2009/0079585 | A1* | 3/2009 | Chinomi | B60R 1/04 340/901 |
| 2010/0020170 | A1* | 1/2010 | Higgins-Luthman | B60R 1/062 348/135 |
| 2010/0201816 | A1* | 8/2010 | Lee | B60R 1/12 348/148 |
| 2010/0245579 | A1* | 9/2010 | Hongo | B60R 1/074 348/148 |
| 2012/0050470 | A1* | 3/2012 | Oba | H04N 5/23229 348/43 |
| 2012/0140072 | A1* | 6/2012 | Murashita | G06K 9/00805 348/148 |
| 2012/0242834 | A1* | 9/2012 | Satoh | G06T 11/00 348/148 |
| 2012/0274737 | A1* | 11/2012 | Kuboyama | G06T 3/0018 348/36 |
| 2013/0125050 | A1* | 5/2013 | Goshey | G06F 3/048 715/800 |
| 2013/0222127 | A1* | 8/2013 | Ray Avalani | G08G 1/167 340/436 |
| 2014/0225723 | A1* | 8/2014 | Sobue | B60R 1/00 340/435 |
| 2014/0368657 | A1* | 12/2014 | Konuki | B60R 1/02 348/148 |
| 2015/0043083 | A1* | 2/2015 | Konuki | B60R 1/04 359/630 |
| 2015/0274074 | A1* | 10/2015 | Petrillo | B60R 1/00 701/36 |
| 2015/0302259 | A1* | 10/2015 | Oshida | G06K 9/46 382/103 |
| 2016/0180176 | A1* | 6/2016 | Yamamoto | H04N 5/225 382/103 |
| 2016/0209647 | A1* | 7/2016 | Fursich | G02B 27/0093 |
| 2016/0216128 | A1* | 7/2016 | Takano | B62D 15/0295 |
| 2016/0350974 | A1* | 12/2016 | Hashimoto | G06T 19/006 |
| 2017/0015238 | A1* | 1/2017 | Yamada | B60Q 1/18 |
| 2017/0066375 | A1* | 3/2017 | Kato | G06T 11/60 |
| 2017/0124877 | A1* | 5/2017 | Sim | G08G 1/167 |
| 2017/0305345 | A1 | 10/2017 | Hashimoto et al. | |
| 2017/0368993 | A1 | 12/2017 | Imura et al. | |

FOREIGN PATENT DOCUMENTS

| | | | | |
|---|---|---|---|---|
| JP | 2003255925 A | * | 3/2003 | ............ H04N 7/181 |
| JP | 2010-095086 A | | 4/2010 | |
| JP | 2010-109684 A | | 5/2010 | |
| JP | 2016-049953 A | | 4/2016 | |
| JP | 2016-055684 A | | 4/2016 | |
| JP | 2016055684 A | * | 4/2016 | ............ B60R 1/00 |
| JP | 2016-110501 A | | 6/2016 | |
| JP | 2016110501 A | * | 6/2016 | ............ B60R 1/00 |
| KR | 100882689 B1 | * | 2/2009 | |
| KR | 20100033161 A | * | 3/2010 | ............ G08G 1/167 |
| WO | WO-2016178190 A1 | * | 11/2016 | ............ H04N 7/188 |

* cited by examiner

IMAGE DISPLAY DEVICE

CROSS-REFERENCE TO RELATED APPLICATIONS

The present application claims priority from Japanese Patent Application No. 2017-083341 filed on Apr. 20, 2017, the entire contents of which are hereby incorporated by reference.

BACKGROUND

1. Technical Field

The present invention relates to an image display device for displaying a captured image of a rear-side view from a vehicle, and more particularly to an image display device enabling intuitive danger recognition.

2. Related Art

In a vehicle such as an automobile, use of an image display device (i.e., a monitoring camera system) that displays an image captured by cameras provided at a side portion, a rear portion of a vehicle body in place of or in combination with conventional mirrors has been proposed as a rear-side view monitoring unit of a vehicle.

As a prior art relating to such an image display device, Japanese Unexamined Patent Application Publication No. H10-257482, for example, discloses a vehicle surrounding condition display device for displaying vehicle left and right side images captured by CCD cameras attached in proximity to a left and a right door mirror, and an image of the rear portion of the vehicle captured by a CCD camera attached to the rear portion of the vehicle, on a liquid crystal panel installed on an instrument panel, wherein one infinity point is set by combining three infinity points of three images of the left, right, and rear sides, and the left, right, and rear side images are synthesized as seen from one virtual viewpoint.

In Japanese Unexamined Utility Model Application Publication No. H7-30149, compact color television cameras are provided at or near a door mirror position of an automobile and in the center of the rear portion of the automobile, and images captured by each of the television cameras are trimmed and displayed as one image on a television monitor at the driver's seat.

SUMMARY OF THE INVENTION

An aspect of the present invention provides an image display device including: an image capturing unit configured to capture an image of a rearview and a sideview from a host vehicle, and a display unit configured to display, as a display image, a captured image captured by the image capturing unit or a generated image generated based on the captured image. The display unit includes a first area for displaying the display image that includes an area to the rearview of the host vehicle and a second area, being arranged adjacent to the first area, for displaying the display image that includes an area to the sideview of the host vehicle. The displayed image displayed in the second area is image-processed in such a manner that an aspect ratio changes with respect to an aspect ratio of the display image displayed in the first area.

DETAILED DESCRIPTION

An example of an image display device to which the present invention is applied will be described below. Note that the following description is directed to an illustrative example of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid redundant description.

In order to reduce the monitoring burden on a user when displaying the images captured in each of the rear, left-rear, and right-rear directions viewed from a host vehicle, it is preferable to display whole images as one image on a single display, or display the images continuously on displays adjacently arranged.

However, in order to easily perceive another vehicle, which is going to overtake a host vehicle in a lane running adjacent to the host vehicle traveling lane, a direct visual perception of a target object is considered more superior than any information regarding the target object, from a danger recognition standpoint.

It is desirable to provide an image display device that enables intuitive danger recognition.

The image display device according to the example is a monitoring camera system provided in a vehicle such as a passenger car that presents an image, obtained by imaging the rear-side view from the vehicle body with cameras, to a user such as a driver.

Figure 1:
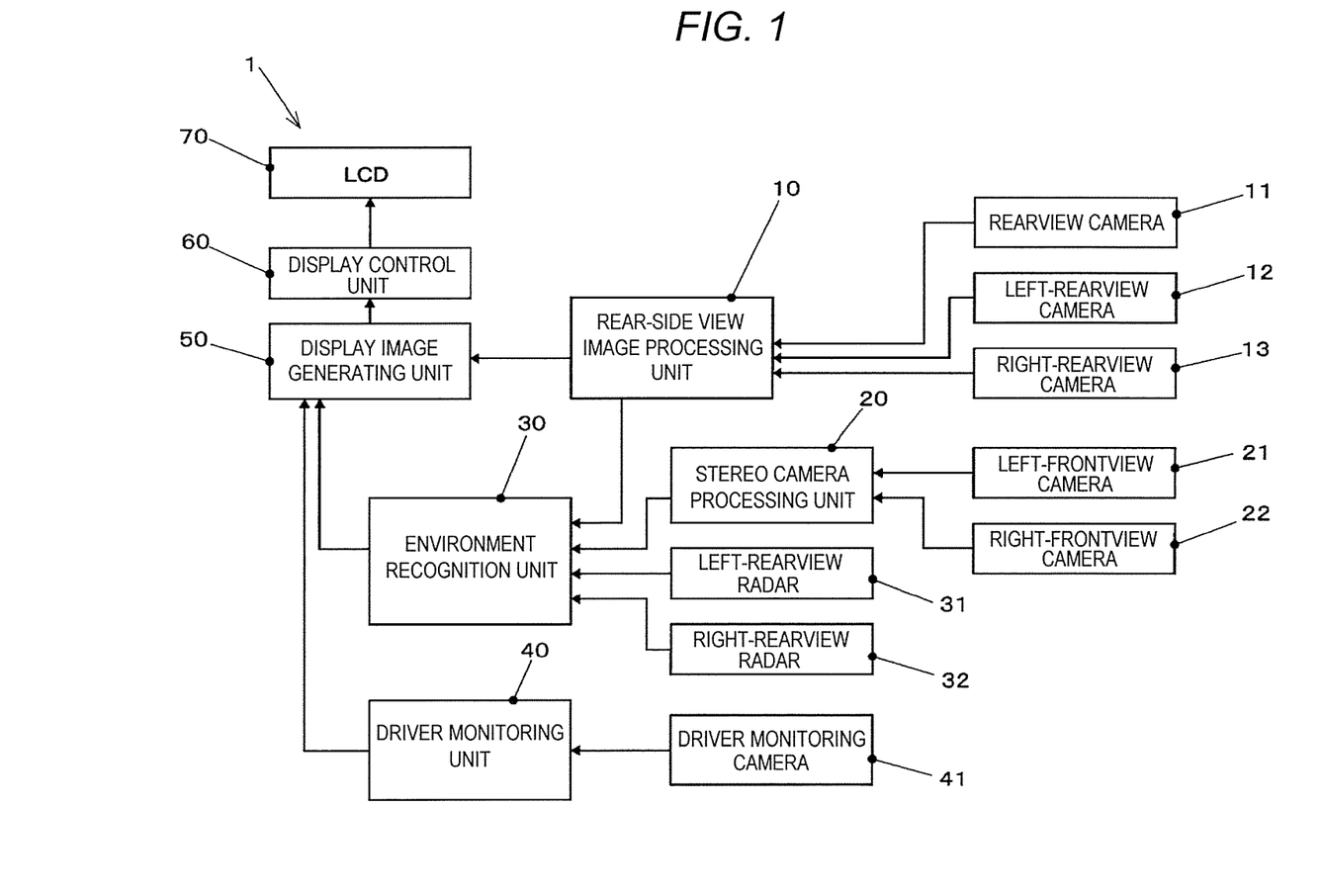
FIG. 1 is a block diagram illustrating a configuration of an example of an image display device to which the present invention is applied.

FIG. 1 is a block diagram illustrating a configuration of the image display device according to the example.

An image display device 1 includes a rear-side image processing unit 10, a rearview camera 11, a left-rearview camera 12, a right-rearview camera 13, a stereo camera processing unit 20, a left-frontview camera 21, a right-frontview camera 22, an environment recognition unit 30, a left-rearview radar 31, a right-rearview radar 32, a driver monitoring unit 40, a driver monitoring camera 41, a display image generating unit 50, a display control unit 60, an LCD 70.

The rear-side image processing unit 10 is a digital signal processing device that processes the output signals of the rearview camera 11, the left-rearview camera 12, and the right-rearview camera 13 and outputs the processed signals as image data.

The image signal output from the rear-side image processing unit 10 is transmitted to the environment recognition unit 30 and the display image generating unit 50.

The rearview camera 11, the left-rearview camera 12, and the right-rearview camera 13 capture video of the conditions around the vehicle and output image signals in real time basis. Each camera includes a solid-state imaging device such as a CMOS and a driving device thereof, a lens.

Figure 2:
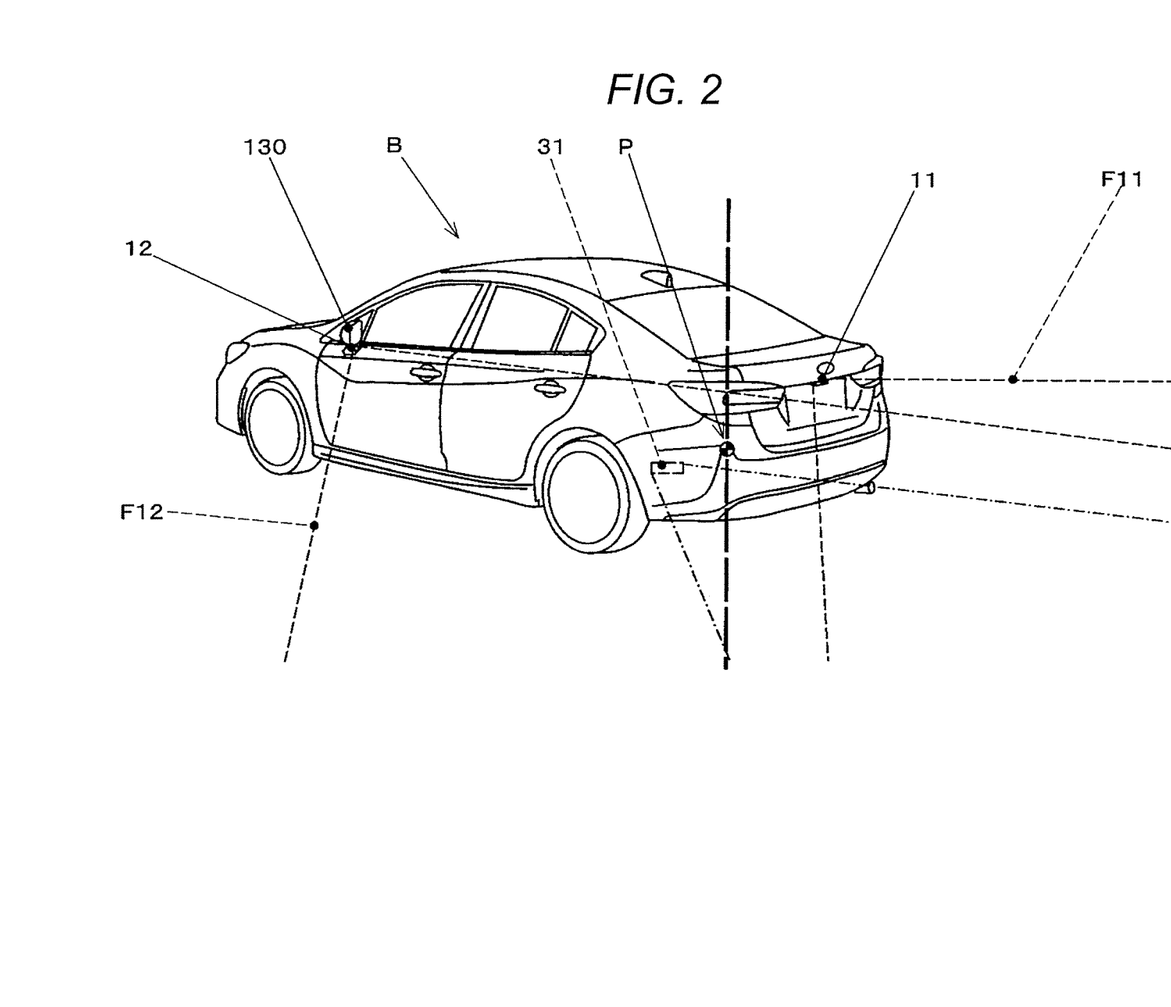
FIG. 2 is a schematic perspective drawing illustrating an arrangement of rear-side view cameras, etc. in the image display device according to the example.

FIG. 2 is a schematic perspective drawing illustrating an arrangement of rear-side view cameras, etc. in the image display device according to the example.

The rearview camera 11 is disposed at the center of the vehicle width direction at the rear end of the vehicle body B such that the optical axis is directed toward the vehicle rear side.

The left-rearview camera 12 is disposed on the left side of the vehicle body B such that the optical axis is directed outward, in the vehicle width direction, and rearward.

The left-rearview camera 12 is disposed, for instance, at a position adjacent to a side mirror 130.

The field of view (i.e., the capturable range) F12 of the left-rearview camera 12 partially overlaps the field of view F11 of the rearview camera 11, which turns out the entire image, ranging from the rear to the left side of a host vehicle, being captured substantially without any blind spot by at least one of the cameras.

The right-rearview camera 13 (not included in FIG. 2) is disposed in a substantially symmetrical manner with the left-rearview camera 12.

The stereo camera processing unit 20 performs known stereo camera processing on images captured by the left-frontview camera 21 and the right-frontview camera 22, and detects objects in front of the host vehicle and the distance of the objects from the host vehicle.

The output of the stereo camera processing unit 20 is transmitted to the environment recognition unit 30.

The left-frontview camera 21 and the right-frontview camera 22 video capture conditions in front of the vehicle and output image signals in real time. Each camera includes a solid-state imaging device such as a CMOS, a driving device thereof, a lens, etc.

The left-frontview camera 21 and the right-frontview camera 22 are disposed, for instance, in proximity to the upper edge of the windshield in the vehicle cabin and spaced apart in the left-right direction.

The environment recognition unit 30 perceives the surroundings of the host vehicle based on information provided from the rear-side image processing unit 10, the stereo camera processing unit 20, the left-rearview radar 31, the right-rearview radar 32.

In one example, the environment recognition unit 30 may associate together with the left-rearview radar 31 and the right-rearview radar 32, functioning as "another vehicle detection unit".

The environment to be perceived includes the shape of the lane on which the host vehicle is traveling, the shape of the lane adjacent to the lane on which the host vehicle is traveling, other vehicles traveling around the host vehicle, pedestrians, obstacles such as built structures (e.g., buildings, guardrails, signs, traffic lights, bridge beams, tunnels, median strips, road side bands).

The left-rearview radar 31 and the right-rearview radar 32 are for detecting objects such as other vehicles which are in the rear-side view from the host vehicle.

For the left-rearview radar 31 and the right-rearview radar 32, a millimeter-wave radar, for instance, can be used.

The left-rearview radar 31 and the right-rearview radar 32 are capable of detecting the relative position of another vehicle with respect to the host vehicle when in the presence of another vehicle. Based on the movement of the relative position, the relative speed of the other vehicle with respect to the host vehicle can be calculated.

The left-rearview radar 31 and the right-rearview radar 32 are arranged on the left and right in the rear portion of the vehicle body, such as a rear bumper.

The driver monitoring unit 40 detects the posture, behavior, gaze direction, etc. of the user (i.e., the driver in manual operation) based on the image captured by the driver monitoring camera 41.

The driver monitoring camera 41 is provided on the front side of the driver in the vehicle cabin.

In one example, the driver monitoring unit 40 may function as a viewpoint detection unit for detecting the viewpoint position when the user turns rearwardly and directly views the situation in the rear-side view from the vehicle.

The display image generating unit 50 generates a display image to be displayed on the LCD 70 based on inputs from the rear-side image processing unit 10, the environment recognition unit 30, and the driver monitoring unit 40.

The function of the display image generating unit 50 and examples of the generated display image will be described later in detail.

It should be noted that the displayed image may be a spot image (i.e., a captured image) obtained by performing predetermined image processing on images captured by the rearview camera 11, the left-rearview camera 12, and the right-rearview camera 13, or may be a computer graphics image or the like (i.e., a generated image based on the captured image) for displaying information corresponding to the image. Also, the displayed image may be synthesized by superimposing the captured image and the computer graphics image.

The display control unit 60 is a display driving device for displaying the display image generated by the display image generating unit 50 on the LCD 70.

The LCD 70 is provided in front of the user (i.e., the passenger/driver during manual driving) and is a unit for displaying the displayed image to the user.

The arrangement of the LCD 70 in the vehicle cabin will be described in detail later.

Figure 3:
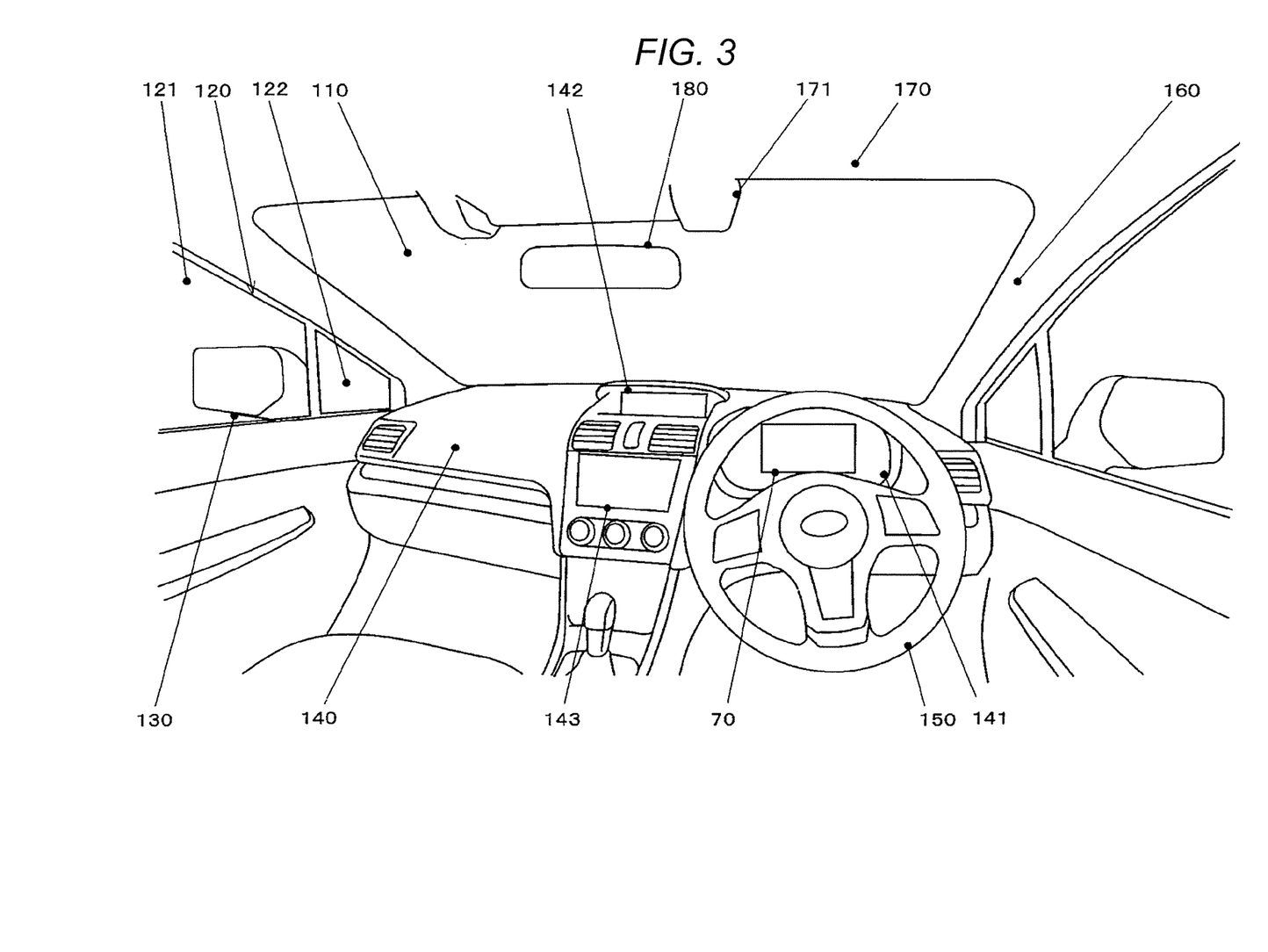
FIG. 3 is a drawing illustrating an instance of a user's field of view in a vehicle having the image display device according to the example.

FIG. 3 is a drawing illustrating an instance of a user's field of view in a vehicle having the image display device according to the example.

As illustrated in FIG. 3, the vehicle has a windshield 110, a front door glass 120, a side mirror 130, an instrument panel 140, a steering wheel 150, an A-pillar 160, a roof 170, a room mirror 180, and so on.

The windshield 110 is disposed in front of the driver.

The windshield 110 is a quadratic curved glass pane which is formed in a substantially oblong rectangular shape and curved in a direction in which the front is convex.

The windshield 110 is inclined rearward such that the upper edge of the windshield 110 is oriented to the vehicle rear with respect to the lower edge.

The front door glass 120 is an upper portion of the left and right front doors used by the passenger for getting on and off the vehicle and is provided to the side of the driver.

The front door glass 120 has an elevating main body 121 and a fixed triangular window 122 provided at the front of the main body 121.

With the side mirror 130, on each side of the vehicle, the driver checks the left and right rear fields of view, respectively.

Each side mirror 130 protrudes outward in the vehicle width direction from the outer panels of the left and right front doors, respectively.

In the user's field of view, each side mirror 130, for instance, is seen near the front end of the main body 121 of the front door glass 120.

The instrument panel 140 is an interior member provided in the vehicle cabin below the windshield 110.

The instrument panel 140 also functions as a cabinet housing various instruments, display devices, switches, air conditioners, passenger airbag devices, knee protecting airbag devices, and so on.

The instrument panel 140 is provided with a combination meter 141, a multifunction display 142, a navigation device display 143, and so on.

The combination meter 141 is provided at the front of the driver's seating area, and is formed by unitizing various instruments such as a speedometer, an engine revolution meter, and a distance meter.

The combination meter 141 incorporates the LCD 70.

The multifunction display 142 is an image display unit, such as an LCD, provided on the upper portion of the center of the instrument panel 140 in the vehicle width direction.

The navigation device display 143 is provided at the lower portion of the center of the instrument panel 140 in the vehicle width direction.

The steering wheel 150 is an annular operating member for inputting a steering operation when the driver manually operates the vehicle.

The steering wheel 150 is provided substantially in front of the driver.

The combination meter 141 is visible from the inner diameter side of the upper half of the steering wheel 150 in the user's field of view.

The A-pillar 160 is a columnar vehicle body structural member arranged along the side edge of the windshield 110 and the front edge of the front door glass 120.

The vehicle interior surface of the A-pillar 160 is covered with a resin pillar trim.

The roof 170 is formed to extend rearward from the upper edge of the windshield 110.

The vehicle interior surface of the roof 170 is covered with a resin roof trim.

A stereo camera housing portion 171 which accommodates the left-frontview camera 21 and the right front camera 22 is provided at the front edge of the roof 170 in the center in the vehicle width direction.

The room mirror 180 is a mirror for checking rearward provided in the vehicle cabin.

The room mirror 180 is provided via a stay (not illustrated) in proximity to the upper edge of the windshield 110 in the center in the vehicle width direction.

Next, the display image of the LCD 70 in the present example will be described.

The display image described below is generated by the display image generating unit 50.

Figure 4:
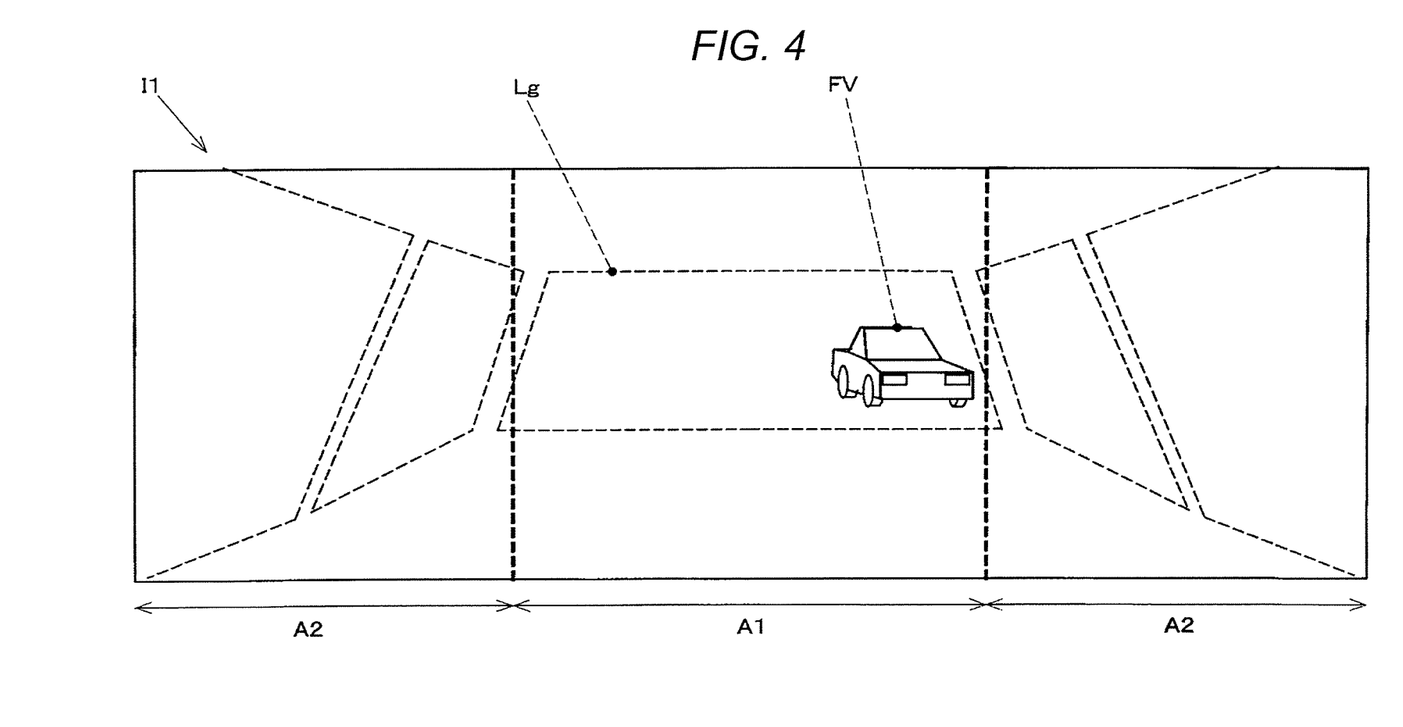
FIG. 4 is a drawing illustrating an instance of a display image of the image display device according to the example in which another vehicle is in the rear view from the host vehicle.

FIG. 4 is a drawing illustrating a display image exemplified on the image display device according to the example in which another vehicle is in the rear view from the host vehicle.

Figure 5:
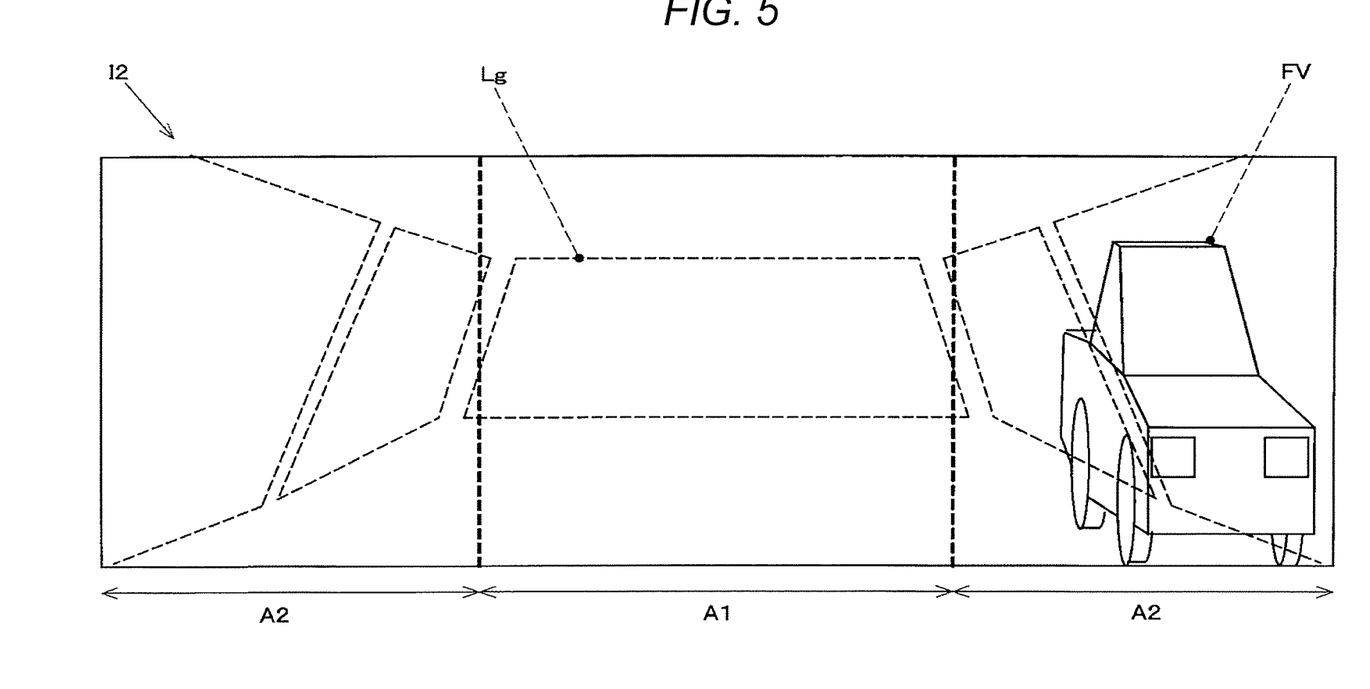
FIG. 5 is a drawing illustrating another instance of a displayed image of the image display device according to the example in which another vehicle is in the rear-side view from the host vehicle.

FIG. 5 is a drawing illustrating another displayed image exemplified on the image display device according to the example in which another vehicle is in the rear-side view from the host vehicle.

In the example, a reference point P (see FIG. 2) is set at a rear-side portion of the vehicle body, and when viewed from a virtual viewpoint predetermined in the vehicle cabin. Further, the area to the rear of the reference point P with respect to the host vehicle is defined as the first area A1 while the area in front of the reference point P with respect to the host vehicle is defined as the second area A2.

The virtual viewpoint is predetermined, for instance, to the head position of the user (i.e., the driver in manual operation) detected by the driver monitoring unit 40.

As illustrated in FIGS. 4 and 5, the image of the first area A1 and the images of the second areas A2 on the right and left are continuously displayed in the same display image I1, I2.

A line Lg indicating the outer peripheral edge of each glass window when viewed from the virtual viewpoint is superimposed on the display image I1, I2 with images outside of the vehicle provided by the rear-side image processing unit 10.

At this time, in the display image I1, I2, the image is in a state in which the pillar is seen through so that an object such as another vehicle can be visually observed even if it within a range corresponding to the pillar.

In addition, the display image I1, I2 can be inverted left to right so that the user does not feel uncomfortable, as when visually confirming the rear-side view from the vehicle using mirrors.

That is, in the display image I1, I2, the second area A2 displayed on the right side shows the situation in the right-rearview from the host vehicle, and the second area A2 displayed on the left side shows the situation in the left-rearview from the host vehicle.

In the present example, an image displayed in the first area A1 is subjected to image processing so that the aspect ratio thereof is substantially equal to a view by the naked eye.

On the other hand, an image displayed in the second area A2 is displayed as a deformed image in which the aspect ratio is changed such that the vertical dimension is enlarged with respect to the horizontal dimension.

In FIG. 4, since a following vehicle FV is behind the host vehicle and is included within the first area A1 of the display image I1, the image of the following vehicle FV is not displayed as a deformed image in which the aspect ratio is changed.

On the other hand, in FIG. 5, the following vehicle FV is attempting to overtake the host vehicle by changing to an adjacent lane so that the following vehicle FV is in the rear-side view from the host vehicle with being included in the second area A2 of the display image I2.

In this case, the image of the following vehicle FV is deformed so that the dimension in the vertical direction is enlarged.

Here, the degree of change in the aspect ratio is set to be larger at the vehicle front side with respect to the vehicle rear side.

In one example, the environment recognition unit 30 may function as a "risk determination unit" that determines the contact risk with the following vehicle FV.

The environment recognition unit 30 determines that the contact risk is higher as the relative speed at which the following vehicle FV approaches the host vehicle increases or the estimated tire path at the time of passing alongside the host vehicle approaches the host vehicle.

When the following vehicle FV having a high contact risk higher than a predetermined value approaches the host vehicle, the display image generating unit 50 increases the degree of change of the aspect ratio in the second area, thereby increasing the degree of deformation, to give the user a stronger sense of incompatibility so as to prompt recognition of imminent danger.

According to the above-described example, the following effects can be obtained:

(1) The second area A2 is the area on a side of the host vehicle with having a risk of collision with the traveling vehicles in an adjacent lane, such as the following vehicle FV, in the case where a lane change is made by the host vehicle. By displaying the image of the second area A2 in such a way that the aspect ratio changes with respect to the image of the first area A1, the image of the subject is strongly deformed and the user comes to have a discomfort feeling, which enables the user to intuitively perceive the front and rear position of the obstacle and/or the relative position with respect to the host vehicle, resulting in an appropriate recognition of danger being prompted.

(2) By increasing the degree of change in the aspect ratio of the image displayed in the second area A2 for objects closer to the front of the host vehicle with respect to the rear of the host vehicle, the above-mentioned effect can be further enhanced.

(3) By viewing from the virtual viewpoint predetermined based on the user head position detected by the driver monitoring unit 40 and, in the second area A2, displaying the area in front of the reference point P with being set at the rear-side end of the rear bumper, the second area A2 can be appropriately set so that the second area A2 includes an area in which there is a fear of contact with the following vehicle FV, when the host vehicle changes lanes.

Further, by using a specific part of the vehicle body as a reference, the user intuitively perceives the boundary between the first area and the second area by association with the user's own sense (i.e., the vehicle sense) of the vehicle size and shape.

Further, by bringing the virtual viewpoint of the displayed image closer to the viewpoint position when a user views with the naked eye, it is possible to generate an image that can be perceived intuitively without discomfort.

(4) When the risk of contact with the following vehicle FV displayed in the second area A2 is high, it is possible for the user to intuitively and quickly perceive that risk of contact with the following vehicle FV is high by increasing the degree of change in the aspect ratio of the second area A2.

(5) By displaying the line Lg at the position corresponding to the outer peripheral edge of the glass window in the display image I1, I2, it is possible for the user to intuitively perceive in which direction the object, displayed on the display images I1, I2, resides in visual view with the naked eye.

MODIFIED EXAMPLE

The present invention is not limited to the above-described examples. Various modifications and changes are possible, and they are also within the technical scope of the present invention.

(1) The configuration of the image display device and the vehicle on which the image display device is mounted is not limited to the above-described example and can be appropriately changed.

For instance, the quantity and arrangement of cameras and radars can be appropriately changed. The example provides one each of a rearview, left-rearview, and right-rearview camera, but a configuration provided with a plurality of each camera is also permissible. Further, for instance, rearview camera and rear-side view camera functions may be combined by using a single wide-angle camera.

(2) In the example, other vehicles approaching from the rear-side are detected using a rear-side radar. However, the present invention is not limited to this and other cars may be detected by other methods such as camera images or inter-vehicle communication.

(3) In the example, the aspect ratio is changed such that the vertical dimension is enlarged with respect to the horizontal dimension in the second area, but the aspect ratio may be enlarged such that the horizontal dimension is enlarged with respect to the vertical dimension.

Further, the scale of the second area may be changed so that the entire area is enlarged or reduced along with changes in the aspect ratio.

(4) In the example, the reference point P is set at the rear-corner end of the rear bumper but the setting of the reference point can be appropriately changed. For instance, the reference point may be set at any position such as the trunk lid top surface, the rear edge of the roof, a side edge of the roof, in proximity to a rear combination lamp.

Further, instead of such a reference point, a front edge of a pillar provided in the rearmost part of the vehicle body as viewed from the virtual viewpoint (i.e., a C-pillar in the case of a three-box car, etc., a D-pillar in the case of a station wagon car, etc.), and the side in front of the reference line disposed substantially along the rear edge may be set as the second area.

Also, the position of the virtual viewpoint is not limited to a position on the user's head but can be appropriately changed. For instance, the position of the room mirror provided in the vehicle cabin may be set as the virtual viewpoint.

The invention claimed is:

1. An image display device comprising:
one or more cameras that capture one or more images corresponding to a rearview and a sideview from a host vehicle; and
a display that displays, as a display image, a captured image captured by the one or more cameras or a generated image generated based on the captured image,
wherein the display includes 1) a fixed first area for displaying a first part of the display image corresponding to the rearview from the host vehicle, and 2) a fixed second area, being arranged adjacent to the fixed first area of the display, for displaying a second part of the display image corresponding to the sideview from the host vehicle,
wherein the second part of the display image is image-processed in such a manner that an aspect ratio of the second part of the display image in the fixed second area differs from an aspect ratio of the first part of the display image in the fixed first area, and
wherein, when the second part of the display image includes an image of a following vehicle, the aspect ratio of the second part of the display image is set so that:
the image of the following vehicle displayed in the fixed second area appears deformed by enlarging only a vertical dimension of the second part of the display image with respect to a horizontal dimension of the second part of the display image; and a degree of change in the aspect ratio of the image of the following vehicle is set to be larger at a front side of the host vehicle than at a rear side of the host vehicle.

2. The image display device according to claim 1, wherein the display displays an indicator corresponding to an outer edge of a glass window of the host vehicle in such a manner that the indicator is superimposed on the display image, and wherein a part of the indicator displayed in the fixed second area does not appear deformed even if the image of the following vehicle displaying in the fixed second area appears deformed.

3. The image display device according to claim 1, wherein the image of the following vehicle in the second part of the display image is displayed as a deformed image in the fixed second area of the display, and wherein the aspect ratio of the first part of the display image is set to be substantially equal to an aspect ratio of a scene corresponding to the first part of the display image as viewed by a naked eye so not to display the following vehicle as the deformed image in the fixed first area.

4. The image display device according to claim 1, wherein the one or more cameras include:

a rearview camera that is disposed at a rear end of a vehicle body of the host vehicle, the rearview camera having an optical axis directed rearward; and a side-rearview camera that is disposed on a side of the vehicle body, the side-rearview camera having an optical axis directed rearward and outward in a vehicle width direction.

5. The image display device according to claim 4, wherein the side-rearview camera is disposed adjacent to a side mirror of the host vehicle.

6. The image display device according to claim 1, wherein the aspect ratio of the second part of the display image changes in accordance with a relative speed at which a second vehicle approaches the host vehicle from a rear-side of the host vehicle.

7. An image display device comprising:

one or more cameras that capture one or more images corresponding to a rearview and a sideview from a host vehicle; and a display that displays, as a display image, a captured image captured by the one or more cameras or a generated image generated based on the captured image, wherein the display includes 1) a first area for displaying a first part of the display image corresponding to the rearview from the host vehicle, and 2) a second area, being arranged adjacent to the first area of the display, for displaying a second part of the display image corresponding to the sideview from the host vehicle, wherein the second part of the display image is image-processed in such a manner that an aspect ratio differs from an aspect ratio of the first part of the display image, and wherein, when the second part of the display image includes an image of the following vehicle, the aspect ratio of the second part of the display image is set so that:

the image of the following vehicle displayed in the second area appears deformed by enlarging only a vertical dimension of the second part of the display image with respect to a horizontal dimension of the second part of the display image; and a degree of change in the aspect ratio of the image of the following vehicle is set to be larger at a front side of the host vehicle than at a rear side of the host vehicle.

* * * * *